United States Patent

Beck et al.

Patent Number: 5,848,677
Date of Patent: Dec. 15, 1998

[54] VIBRATION DAMPER FOR A MOTOR VEHICLE AND A PISTON CYLINDER ASSEMBLY; SUCH AS FOR A VIBRATION DAMPER FOR A MOTOR VEHICLE

[75] Inventors: Hubert Beck, Eitorf; Werner Kuchheuser, Windeck; Wilhelm Wortmann, Hennef, all of Germany

[73] Assignee: Fichtel & Sachs AG, Eitorf, Germany

[21] Appl. No.: 697,872

[22] Filed: Aug. 29, 1996

[30] Foreign Application Priority Data

Aug. 30, 1995 [DE] Germany .......... 195 31 794.7

[51] Int. Cl.⁶ ................... F16F 9/00; F16F 9/36
[52] U.S. Cl. ................... 188/322.22; 188/322.16
[58] Field of Search ................ 188/300, 315, 188/316, 319.1, 322.16–322.19; 267/64.17, 64.24, 64.26, 118, 122, 124, 126, 195, 217, 226

[56] References Cited

U.S. PATENT DOCUMENTS

| | | |
|---|---|---|
| 3,497,199 | 2/1970 | Tuczek .................. 267/64.17 |
| 3,963,101 | 6/1976 | Stadelmann et al. ........ 188/300 |
| 4,789,192 | 12/1988 | Warner et al. ............ 293/134 |
| 4,988,081 | 1/1991 | Dohrmann ............... 267/64.15 |
| 5,085,412 | 2/1992 | Peterson et al. .......... 267/64.26 |
| 5,653,425 | 8/1997 | Page et al. .............. 267/64.15 |

FOREIGN PATENT DOCUMENTS

| | | |
|---|---|---|
| 0041342 | 12/1981 | European Pat. Off. . |
| 3935107 | 4/1991 | Germany . |

Primary Examiner—Robert J. Oberleitner
Assistant Examiner—Chris Schwartz
Attorney, Agent, or Firm—Nils H. Ljungman and Associates

[57] ABSTRACT

A piston cylinder assembly which includes a work cylinder, a piston and a piston rod, which piston rod carries the piston and extends out of the work cylinder in a sealed manner, as well as a ring-shaped equalization chamber formed by two tubes is disclosed. The equalization chamber is divided by a separating piston into two partial chambers, the separating piston having two parts which are guided so that they can move in a sealed manner axially on the wall of the respective tube of the compensation chamber facing the respective part. The two parts of the separating piston are connected by a flexible portion allowing them to move radially with respect to one another and are sealed with respect to one another.

21 Claims, 4 Drawing Sheets

VIBRATION DAMPER FOR A MOTOR VEHICLE AND A PISTON CYLINDER ASSEMBLY; SUCH AS FOR A VIBRATION DAMPER FOR A MOTOR VEHICLE

BACKGROUND OF THE INVENTION

1. Field of the Invention

The present invention relates to a piston cylinder assembly which consists of a work cylinder, a piston and a piston rod, which piston rod carries the piston and extends out of the work cylinder in a sealed manner, as well as a ring-shaped equalization chamber which is formed by two tubes, the equalization chamber being divided into two partial chambers by a separating piston.

2. Background Information

Hydropneumatic piston cylinder assemblies are described in, for example, German Laid Open Patent Application No. 39 35 107, European Patent No. 0.224.825, and European Laid Open Patent Application No. 0.041.342, wherein an equalization chamber or a ring-shaped chamber filled with a hydraulic fluid has a separating piston. Such ring-shaped separating pistons are located in ring-shaped chambers, and seal both the inside wall and the outside wall with respect to the partial chambers which are located on both sides of the ring-shaped separating piston. Since the ring-shaped separating piston is provided with a one piece main body, the problem is that the inner tube must be correctly aligned with the outer tube to prevent the ring-shaped separating piston from jamming during its axial displacement inside the equalization chamber. When the piston cylinder assembly is mass produced, corresponding manufacturing tolerances must already be accepted for economic reasons, which means that it is not always possible to use such a separating piston without employing additional measures.

OBJECT OF THE INVENTION

One object of the present invention is the provision of a separating piston for an equalization chamber of a piston cylinder assembly in which the manufacturing tolerances of the guide surfaces do not have any appreciable adverse effect on the seal or on the axial movement of the separating piston.

SUMMARY OF THE INVENTION

The invention teaches that this object can be accomplished by the provision of a separating piston having respective parts which move axially along the wall of the respective tube of the equalization chamber facing the part in question, and which parts are guided in a sealed manner, and that the two parts of the separating piston are free to move radially in relation to one another and are sealed with respect to one another.

One advantage of such a solution is that an economical ring-shaped separating piston is formed which consists of few parts, and which creates a satisfactory seal even in the event that manufacturing tolerances cause fluctuations in the coaxial orientation of the individual tubes in relation to one another. In addition, the piston does not tend to tilt and cause excessive friction or jam during axial displacement, because the individual parts are arranged so that they can move radially in relation to one another.

In an additional embodiment, the parts of the separating piston are connected to one another by means of a flexible area. The flexible area is preferably advantageously realized in the form of an elastic rubber membrane or an elastic rubber tubular element.

The flexible area can also be realized in the form of thin-walled bellows made of metal, plastic or a similar material.

In another embodiment, the flexible area consists of a groove-spring connection. This groove-spring connection can thereby easily be provided with a gasket.

In a further embodiment, the gasket of the groove-spring connection simultaneously represents a seal with respect to the inner and outer wall.

In a still further embodiment, the two parts are provided with a radial spring bias in relation to one another. In this case, a corresponding compensation for any manufacturing tolerances can be provided in the radial direction. A corresponding application force is also exerted on the respective gasket.

In yet another embodiment, the two parts are nondetachably connected to one another. However, the two parts can also be realized in one piece, in which case appropriate precautions are taken to keep the two parts radially movable in relation to one another.

The above discussed embodiments of the present invention will be described further hereinbelow with reference to the accompanying figures.

BRIEF DESCRIPTION OF THE DRAWINGS

The preferred embodiments of the invention are schematically illustrated in the accompanying drawings, wherein.

DESCRIPTION OF THE PREFERRED EMBODIMENT

Figure 1:
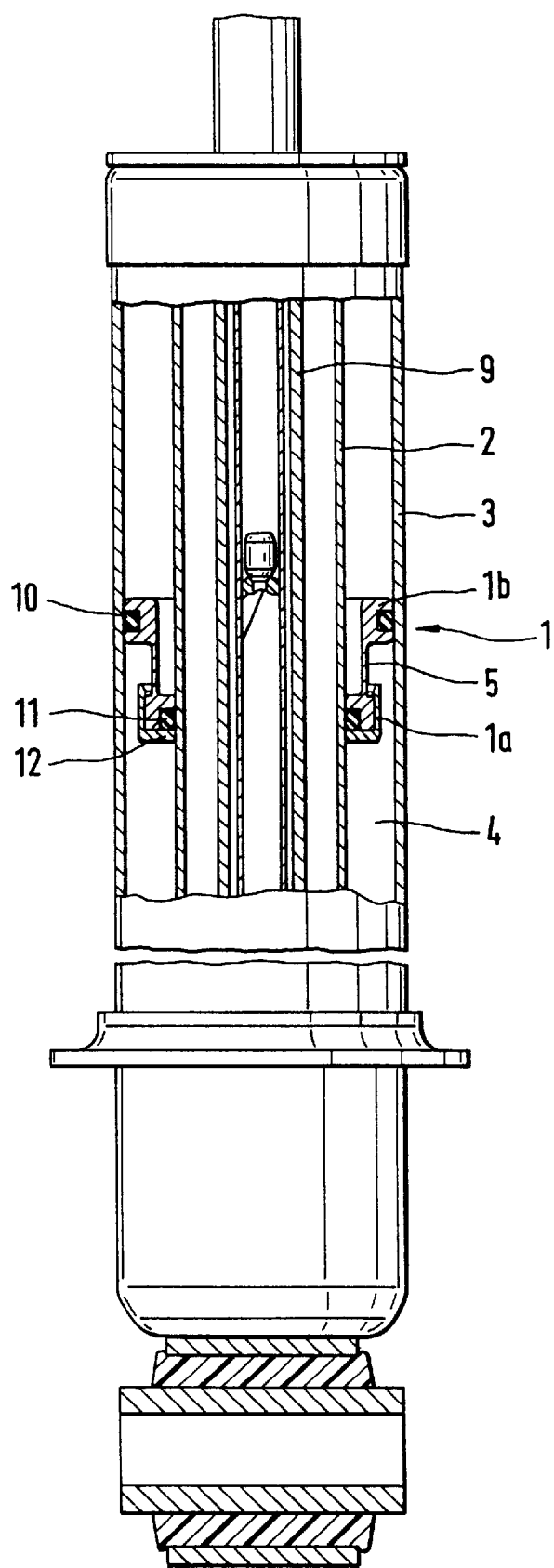
FIG. 1 is an elevational cross sectional view of a vibration damper or hydropneumatic shock absorbing strut, having an equalization chamber and a ring-shaped separating piston.

FIG. 1 illustrates a piston cylinder assembly, which in this case is in the form of a hydropneumatic shock absorbing strut which has an internal level control system but it is also conceivable that the piston cylinder assembly according to the invention can be used in vibration dampers or other similar piston cylinder units. The assembly illustrated in FIG. 1 consists essentially of a container filled with oil and/or gas in which a piston is fastened to a piston rod 9 in the work cylinder, which work cylinder is realized in the form of a tube 2. Coaxially around the tube 2 there is an additional tube 3 which forms an equalization chamber 4, and in which a separating piston 1 divides the equalization chamber 4 into two partial chambers. The partial chambers of the equalization chamber 4 can thereby each be filled with a damping medium, a hydraulic fluid and/or a gas. The type and amount of damping medium in the assembly depends on the function of the piston cylinder assembly, and is independent of the realization of the separating piston 1.

The separating piston 1 consists of a part 1*a* which is guided on the outer wall of the inner tube 2, and a part 1*b*, which is guided so that it can move axially on the inner wall of the outer tube 3. The two parts 1*a* and 1*b* are connected to one another by means of a flexible area 5, so that by means of this flexible area 5, the part 1*a* can move radially in relation to the part 1*b*. To achieve a proper seal of parts 1*a* and 1*b*, there are provided respective gaskets 11 and 10 positioned within respective recesses provided in parts 1*a* and 1*b*. In the embodiment of FIG. 1, the gasket 11 in part 1a is located in an extension, and an element 12 positionally fixes the seal 11 in the recess in part 1a, preferably by means of a snap connection.

As a result of the division of the gasket chamber during the molding and manufacture of the separating piston 1, it is also possible that the gasket chamber can be formed into shape in the axial direction. Forming a closed gasket chamber into shape in the radial direction entails additional effort and expense in terms of tooling, and results in a poorer quality surface.

FIGS. 2 to 9 illustrate individual alternative embodiments of ring-shaped separating pistons 1, each of which is guided in a sealed manner with respect to the outer wall of the inner tube 2 and the inner wall of the outer tube 3.

Figure 2:
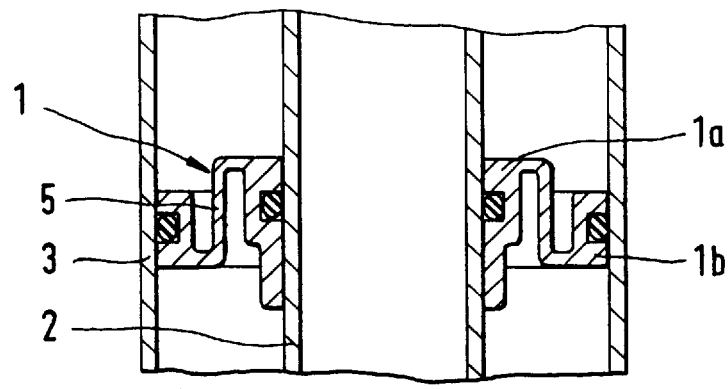
FIGS. 2 to 10 are partial cross sectional views showing individual embodiments of various ring-shaped separating pistons.
Figure 3:
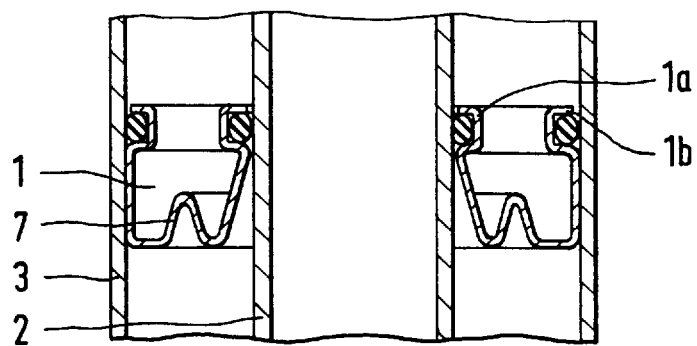

In the embodiment shown in FIG. 2, the part 1a is connected to the part 1b by means of a thin-walled elastic area 5 which extends, at least in part, in the axial direction. FIG. 3 illustrates an embodiment wherein the separating piston 1 is made of thin-walled metal portion 7, whereby the flexible area is realized in the form of a fold extending at least partially in the axial direction, so that the parts 1a and 1b are always urged into contact under a biasing force with the respective wall of the tubes 2 and 3. The gaskets 10 and 11 are located in respective ring-shaped grooves which have been formed into shape in the parts 1a and 1b. In other words, and in accordance with one embodiment, the ends of the metal portion 7 can be formed so as to surround or enclose the gaskets 10, 11.

Figure 4:
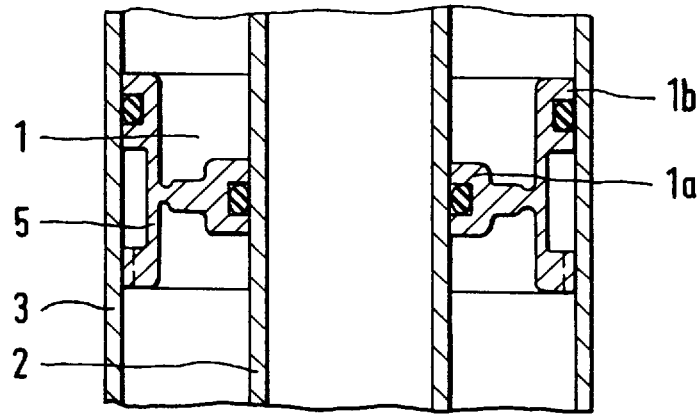

FIG. 4 shows a ring-shaped separating piston 1, in which the part 1a is connected to the part 1b by means of a flexible area 5 (preferably T-shaped in cross section). All the embodiments illustrated in FIGS. 2, 3 and 4 are preferably realized in a single piece.

The embodiments of FIGS. 5 to 8 have separating pistons 1 which are realized as pistons which preferably consist of a plurality of parts, and whereby the parts 1a and 1b are connected to one another by means of a groove-spring connection 6 (as illustrated by way of example in FIGS. 5, 6 and 7) or by means of an elastic rubber element 13 (FIG. 8), which can be tubular, for example. In the groove-and-spring connection 6 illustrated in FIGS. 5 and 6, there is an additional gasket 8 which guarantees a corresponding seal, while the radial mobility of part 1a with respect to part 1b is not thereby adversely affected.

In the embodiment of FIG. 7, the part 1a is again radially movable with respect to part 1b by means of a groove-spring connection 6, while the seal both of the groove-spring connection 6 and of the parts 1a and 1b respectively with respect to the respective tube 2 or 3 is accomplished by means of thin-walled bellows 7. The thin-walled bellows are preferably realized in the form of an elastic rubber membrane.

Figure 9:
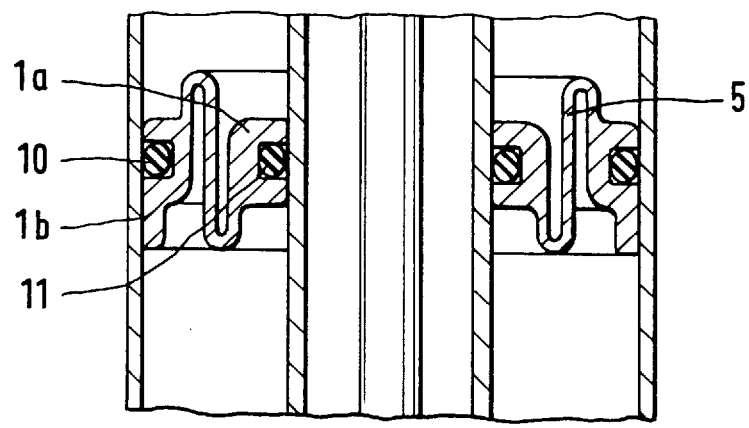
Figure 10:
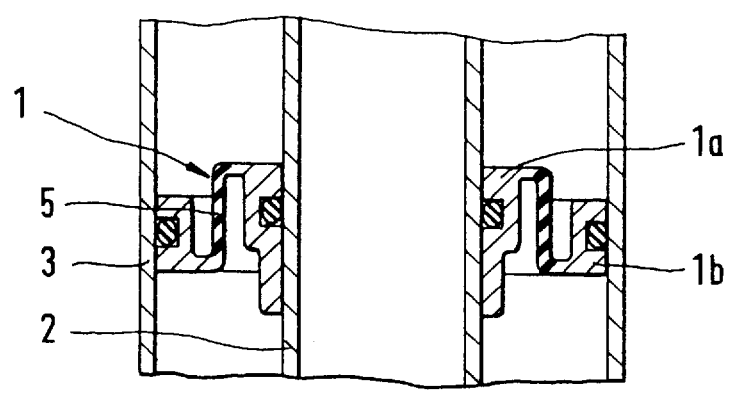

FIG. 9 illustrates an additional embodiment which is in principle the same as the embodiment illustrated in FIG. 2, but where a plastic is preferably used as the material for the spearating piston, while in addition, the parts 1a and 1b can in turn be provided with the gaskets 10 and 11, and the radial equalization is accomplished by the means of the flexible area 5 which is in the form of an area which extends at least partially in the axial direction.

Figure 5:
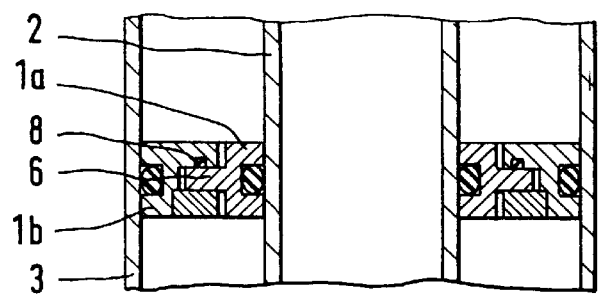
Figure 6:
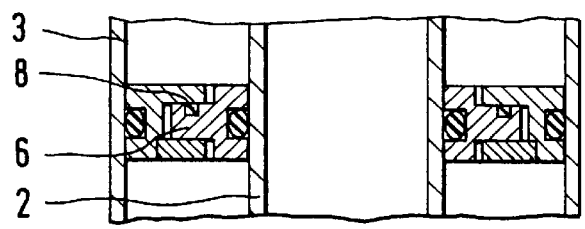
Figure 7:
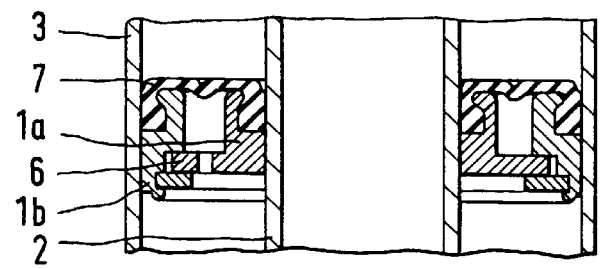
Figure 8:
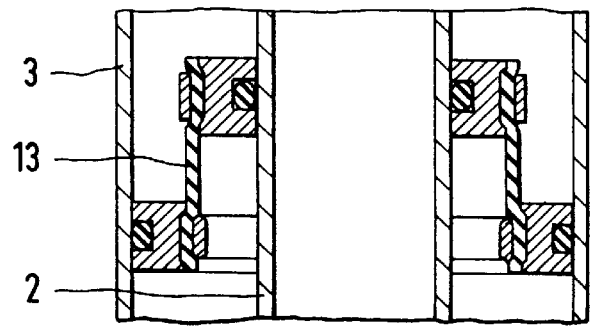

In one embodiment, illustrated for example in FIGS. 5, 6 and 7, the groove-spring connection according to the invention may consist of an annular flange extending outward in a radial direction from one of the parts 1a and 1b and an annular groove provided in the other of the parts 1a and 1b and extending into the other of the parts 1a and 1b. As seen in FIGS. 5, 6 and 7, the annular flange provided on the part 1a extends into and slidingly mates with the annular groove provided on the part 1b, thereby providing a connection whereby the two parts 1a and 1b are free to move relative to one another in the radial direction to a certain degree. In the embodiments of FIGS. 5 and 6, hydraulic fluid leakage through the groove-spring connection 6 is prevented by an O-ring gasket 8 which provides a seal between opposing surfaces of the annular flange and the annular groove, while, in the embodiment of FIG. 7, the groove-spring connection 6 is hydraulically sealed by the provision of the annular bellows member 7 (having a roughly C-shaped cross section), which annular bellows member 7 also serves to seal the parts 1a and 1b against the respective tubes 2 and 3.

In the embodiments illustrated in FIGS. 1, 2, 3, 4 and 9, the parts 1a and 1b are preferably nondetachably connected to one another, and at least in the embodiments of FIGS. 2, 3, 4 and 9, the parts 1a and 1b and the flexible areas 5 and 7 are formed as a single integral component.

One feature of the invention resides broadly in the piston-cylinder assembly consisting of a work cylinder, a piston and a piston rod, which piston rod carries the cylinder and extends out of the work cylinder in a sealed manner, as well as a ring-shaped equalization chamber formed by two tubes, which equalization chamber is divided by a separating piston into two partial chambers, characterized by the fact that the separating piston 1 has two parts 1a and 1b, each of which moves axially on the wall of the respective tube 2, 3 of the equalization chamber 4 facing the respective part 1a or 1b, the separating piston is guided in a sealed manner, and that the two parts of the separating piston 1 can move radially in relation to one another and are sealed with respect to one another.

Another feature of the invention resides broadly in the piston-cylinder assembly characterized by the fact that the parts 1a, 1b of the separating piston 1 are connected to one another by means of a flexible area 5.

Yet another feature of the invention resides broadly in the piston-cylinder assembly characterized by the fact that the flexible area 5 is realized in the form of an elastic rubber membrane or a tubular elastic rubber element 13.

Still another feature of the invention resides broadly in the piston-cylinder assembly characterized by the fact that the flexible area S is realized in the form of thin-walled bellows 7 made of metal, plastic or a similar material.

A further feature of the invention resides broadly in the piston-cylinder assembly characterized by the fact that the flexible area 5 consists of a groove-spring connection 6.

Another feature of the invention resides broadly in the piston-cylinder assembly characterized by the fact that the groove-spring connection 6 is provided with a gasket 8.

Yet another feature of the invention resides broadly in the piston-cylinder assembly characterized by the fact that the gasket 8 of the groove-spring connection 6 is simultaneously sealed with respect to the inner and outer wall.

Still another feature of the invention resides broadly in the piston-cylinder assembly characterized by the fact that the two parts 1a, 1b are provided with a radial spring bias in relation to one another.

A further feature of the invention resides broadly in the piston-cylinder assembly characterized by the fact that the two parts 1a, 1b are non-detachably connected to one another.

Another feature of the invention resides broadly in the piston-cylinder assembly characterized by the fact that the two parts 1a, 1b are realized in one piece.

All, or substantially all, of the components and methods of the various embodiments may be used with at least one embodiment or all of the embodiments, if more than one embodiment is described herein.

Some examples of dual tube shook absorbers which may be utilized in conjunction with the present invention are to be found in U.S. Pat. No. 5,449,055; U.S. Pat. No. 5,435,421; U.S. Pat. No. 5,335,757; U.S. Pat. No. 5,301,776; U.S. Pat. No. 5,251,730; U.S. patent application Ser. No. 08/410,797; U.S. patent application Ser. No. 08/687,735 entitled "Vibration Damper with External Damping Valve" having as inventor Robert Pradel and having the same assignee as the present invention herein and corresponding to and claiming priority from Federal Republic of Germany Patent Application No. 195 27 849.6 filed in the Federal Republic of Germany on Jul. 29, 1995; and U.S. patent application Ser. No. 08/687,686 entitled "Vibration Damper with External Damping Valve" having as inventor Robert Pradel and having the same assignee as the present invention herein and corresponding to and claiming priority from Federal Republic of Germany Patent Application No. 195 27 851.8 filed in the Federal Republic of Germany on Jul. 29, 1995.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A piston cylinder assembly for a vibration damper for a motor vehicle, said piston cylinder assembly comprising:
    an outer tube member;
    an inner tube member;
    said inner tube member being positioned substantially within said outer tube member;
    a first end and a second end;
    a piston disposed within said inner tube member;
    a piston rod connected to said piston and extending out of said first end;
    said outer tube member and said inner tube member having a substantially common longitudinal axis;
    said outer tube member and said inner tube member forming an annular chamber therebetween;
    a separating piston disposed in said annular chamber;
    said separating piston dividing said annular chamber into a first annular chamber portion and a second annular chamber portion;
    said separating piston being disposed between said first annular chamber portion and said second annular chamber portion;
    said separating piston being translatable in a direction substantially parallel to said substantially common longitudinal axis of said outer tube member and said inner tube member; and
    a hydraulic fluid disposed in at least one of said first annular chamber portion and said second annular chamber portion;
    said separating piston comprising:
        a first separating piston portion;
        said first separating piston portion slidingly contacting said inner tube member and said first separating piston portion being translatable in said direction substantially parallel to said common longitudinal axis; and
        a second separating piston portion;
        said second separating piston portion slidingly contacting said outer tube member and said second separating piston portion being translatable in said direction substantially parallel to said common longitudinal axis; and
        radially extensible fluid blocking structure to substantially block the flow of said hydraulic fluid between said first annular chamber portion and said second annular chamber portion through said separating piston, and to provide sufficient relative movement between said first separating piston portion and said second separating piston portion in a direction substantially oblique to said common longitudinal axis to compensate for manufacturing tolerances of one of said inner tube member and said outer tube member.

2. A piston cylinder assembly according to claim 1, wherein:
    said first separating piston portion slidingly contacts a surface of said inner tube member;
    said second separating piston portion slidingly contacts a surface of said outer tube member;
    said radial extensible fluid blocking structure provides sufficient relative movement between said first separating piston portion and said second separating piston portion in a direction substantially oblique to said common longitudinal axis to compensate for manufacturing tolerances of one of said surface of said inner tube member and said surface of said outer tube member.

3. A piston cylinder assembly according to claim 2:
    wherein said radially extensible fluid blocking means comprises a flexible portion extending from said first separating piston portion to said second separating piston portion; and
    said flexible portion being for substantially blocking the flow of said hydraulic fluid between said first annular chamber portion and said second annular chamber portion between said first separating piston portion and said second separating piston portion.

4. A piston cylinder assembly according to claim 3:
    wherein said flexible portion comprises a flexible connecting member connecting said first separating piston portion and said second separating piston portion.

5. A piston cylinder assembly according to claim 4:
    wherein said flexible connecting member comprises a bellows member;
    said bellows member being formed from a thin walled material.

6. A piston cylinder assembly according to claim 5:
    wherein said thin walled material comprises at least one of a metal and a plastic.

7. A piston cylinder assembly according to claim 4:
    wherein said flexible connecting member comprises at least one of an elastic rubber membrane and a tubular elastic rubber element.

8. A piston cylinder assembly according to claim 2:
wherein said radially extensible fluid blocking structure comprises a groove-spring connection between said first separating piston portion and said second separating piston portion.

9. A piston cylinder assembly according to claim 2:
wherein said first separating piston portion, said second separating piston portion and said radially extensible fluid blocking structure are formed as a single integral component.

10. A piston cylinder assembly according to claim 2:
wherein said radially extensible fluid blocking structure comprises a groove and flange connection between said first separating piston portion and said second separating piston portion;
said groove and flange connection comprising:
  a flange extending outward from one of said first separating piston portion and said second separating piston portion; and
  a groove extending inward into the other of said first separating piston portion and said second separating piston portion;
  said flange being slidably mated within said groove to thereby provide said relative movement between said first separating piston portion and said second separating piston portion in said direction substantially oblique to said substantially common longitudinal axis.

11. A piston cylinder assembly according to claim 10:
wherein said flange and said groove each extend in a direction substantially oblique to said substantially common longitudinal axis.

12. A piston cylinder assembly according to claim 11:
wherein said flange has at least one face aligned in said direction substantially oblique to said substantially common longitudinal axis;
wherein said groove also has at least one face aligned in said direction substantially oblique to said substantially common longitudinal axis; and
wherein said groove and flange connection additionally comprises at least one gasket disposed between said at least one face of said flange and said at least one face of said groove.

13. A piston cylinder assembly according to claim 12:
wherein said at least one gasket is in sealing contact with both of said at least one face of said flange and said at least one face of said groove to thereby substantially prevent passage of said hydraulic fluid between said at least one face of said flange and said at least one face of said groove.

14. A piston cylinder assembly according to claim 2:
wherein said piston cylinder assembly additionally comprises radial biasing structure for exerting a biasing force between said first separating piston portion and said second separating piston portion; and
wherein said biasing force exerted by said biasing structure urges said first separating piston portion and said second separating piston portion away from one another along said direction substantially oblique to said common longitudinal axis.

15. A piston cylinder assembly according to claim 2:
wherein said first separating piston portion and said second separating piston portion are nondetachably connected to one another.

16. A vibration damper for damping vibration in a land motor vehicle, said vibration damper comprising:
a piston cylinder assembly;
said piston cylinder assembly having a first end and a second end;
a piston disposed within said piston cylinder assembly and dividing said piston cylinder assembly into first and second working chambers;
a piston rod connected to said piston and extending out of said first end of said piston cylinder assembly;
a first connecting apparatus disposed on said piston rod for connecting to a first portion of the motor vehicle;
a second connecting apparatus disposed on said second end of said piston cylinder assembly for connecting to a second portion of the motor vehicle;
a hydraulic fluid disposed in said first and second working chambers; and
damping apparatus for damping a flow of said hydraulic fluid between said first and second working chambers;
said piston cylinder comprising:
  an outer tube member;
  an inner tube member;
  said inner tube member being positioned substantially within said outer tube member;
  at least a portion of said piston rod being disposed in said inner tube;
  said outer tube member and said inner tube member having a substantially common longitudinal axis;
  said outer tube member and said inner tube member forming an annular chamber therebetween;
  a separating piston disposed in said annular chamber;
  said separating piston dividing said annular chamber into a first annular chamber portion and a second annular chamber portion;
  said separating piston being disposed between said first annular chamber portion and said second annular chamber portion;
  said separating piston being translatable in a direction substantially parallel to said substantially common longitudinal axis of said outer tube member and said inner tube member; and
  said hydraulic fluid being disposed in at least one of said first annular chamber portion and said second annular chamber portion;
said separating piston comprising:
  a first separating piston portion;
  said first separating piston portion slidingly contacting said inner tube member and said first separating piston portion being translatable in said direction substantially parallel to said common longitudinal axis; and
  a second separating piston portion;
  said second separating piston portion slidingly contacting said outer tube member and said second separating piston portion being translatable in said direction substantially parallel to said common longitudinal axis; and
  radially extensible fluid blocking structure to substantially block the flow of said hydraulic fluid between said first annular chamber portion and said second annular chamber portion through said separating piston, and to provide sufficient relative movement between said first separating piston portion and said second separating piston portion in a direction substantially oblique to said common longitudinal axis to compensate for manufacturing tolerances of one of said inner tube member and said outer tube member.

17. A vibration damper according to claim 1:

wherein said radially extensible fluid blocking structure comprises a flexible portion extending from said first separating piston portion to said second separating piston portion;

wherein said first separating piston portion slidingly contacts a first guide surface of said inner tube member;

wherein said second separating piston portion slidingly contacts a second guide surface of said outer tube member;

said flexible portion being for substantially blocking the flow of said hydraulic fluid between said first annular chamber portion and said second annular chamber portion between said first separating piston portion and said second separating piston portion and for providing sufficient relative movement between said first separating piston portion and said second separating piston portion in a direction substantially oblique to said common longitudinal axis to compensate for manufacturing tolerances of one of said first guide surface and said second guide surface.

18. A piston cylinder assembly for a motor vehicle, said piston cylinder assembly comprising:

a first tube member having a cylindrical exterior wall;

a second tube member having a cylindrical interior wall;

a piston disposed in said first tube member;

a piston rod connected to said piston and extending out from said piston cylinder assembly;

said second tube member being disposed along a substantially common longitudinal axis within said first tube member to form an annular chamber between said exterior wall of said first tube member and said interior wall of said second tube member; and a separating piston disposed within said annular chamber and dividing said annular chamber into a first annular chamber portion and a second annular chamber portion;

said separating piston comprising:
a first annular sealing member in sliding and substantially sealing contact with said exterior wall of said first tube member;
a second annular sealing member in sliding and substantially sealing contact with said interior wall of said second tube member;
fluid blocking structure to substantially block passage between said first annular sealing member and said second annular sealing member from said first annular chamber portion to said second annular chamber portion; and
to provide sufficient relative movement between said first annular sealing member and said second annular sealing member in a direction substantially oblique to said substantially common longitudinal axis to compensate for manufacturing tolerances of one of said first tube member and said second tube member.

19. A piston cylinder assembly according to claim 18:

wherein said fluid blocking structure provides sufficient relative movement between said first annular sealing member and said second annular sealing member in a direction substantially oblique to said substantially common longitudinal axis to compensate for manufacturing tolerance of one of said exterior wall of said first tube member and said interior wall of said second tube member; and wherein said fluid blocking structure comprises a flexible connecting member connecting said first and second annular sealing members, said flexible connecting member comprising at least one of:
an elastic rubber membrane;
a tubular elastic rubber element; and
a bellows member, said bellows member comprising a thin walled material, said thin walled material comprising at least one of metal and plastic.

20. A piston cylinder assembly according to claim 19:

wherein said fluid blocking structure comprises:
an annular groove extending inward into one of said first and second annular sealing members; and
an annular flange extending outward from the other of said first and second annular sealing members;
said annular flange extending into and slidingly engaging with said annular groove; and
sealing structure for substantially sealing said sliding engagement of said annular flange with said annular groove.

21. A piston cylinder assembly according to claim 18:

wherein said fluid blocking structure provides sufficient relative movement between said first annular sealing member and said second annular sealing member in a direction substantially oblique to said substantially common longitudinal axis to compensate for manufacturing tolerance of one of said exterior wall of said first tube member and said interior wall of said second tube member;

wherein said fluid blocking structure comprises biasing structure for exerting a biasing force urging said first and second annular sealing members apart in said direction substantially oblique to said substantially common longitudinal axis;

wherein said first and second annular sealing members are nondetachably connected to one another; and wherein said first and second annular sealing members are integrally formed.

* * * * *

UNITED STATES PATENT AND TRADEMARK OFFICE
CERTIFICATE OF CORRECTION

PATENT NO. : 5,848,677
DATED : December 15, 1998
INVENTOR(S) : Hubert BECK, Werner KUCHHEUSER, and Wilhelm WORTMANN It is certified that error appears in the above-identified patent and that said Letters Patent is hereby corrected as shown below:

On the title page, item [56], under the FOREIGN PATENT DOCUMENTS section, after the 'Germany' reference, insert the following reference:

--0224825  6/87  European Pat. Off.--.

In column 4, line 44, after 'area', delete "S" and insert --5--.

In column 8, line 67, Claim 17, after 'claim', delete "1" and insert --16--.

Signed and Sealed this

Twenty-eighth Day of September, 1999

Attest:

Attesting Officer

Q. TODD DICKINSON

Acting Commissioner of Patents and Trademarks